Dec. 29, 1953　　　A. LUKSCH ET AL　　　2,664,281
　　MACHINE FOR CUTTING, CLEANING, GROOVING, AND
　　　　　　　　TREATING SURFACES
Filed Aug. 27, 1949　　　　　　　　　　7 Sheets-Sheet 1

INVENTORS
ANDREAS LUKSCH
LLOYD HALE
BY Paul, Paul & Moore
ATTORNEYS

Dec. 29, 1953  A. LUKSCH ET AL  2,664,281
MACHINE FOR CUTTING, CLEANING, GROOVING, AND
TREATING SURFACES
Filed Aug. 27, 1949  7 Sheets-Sheet 2
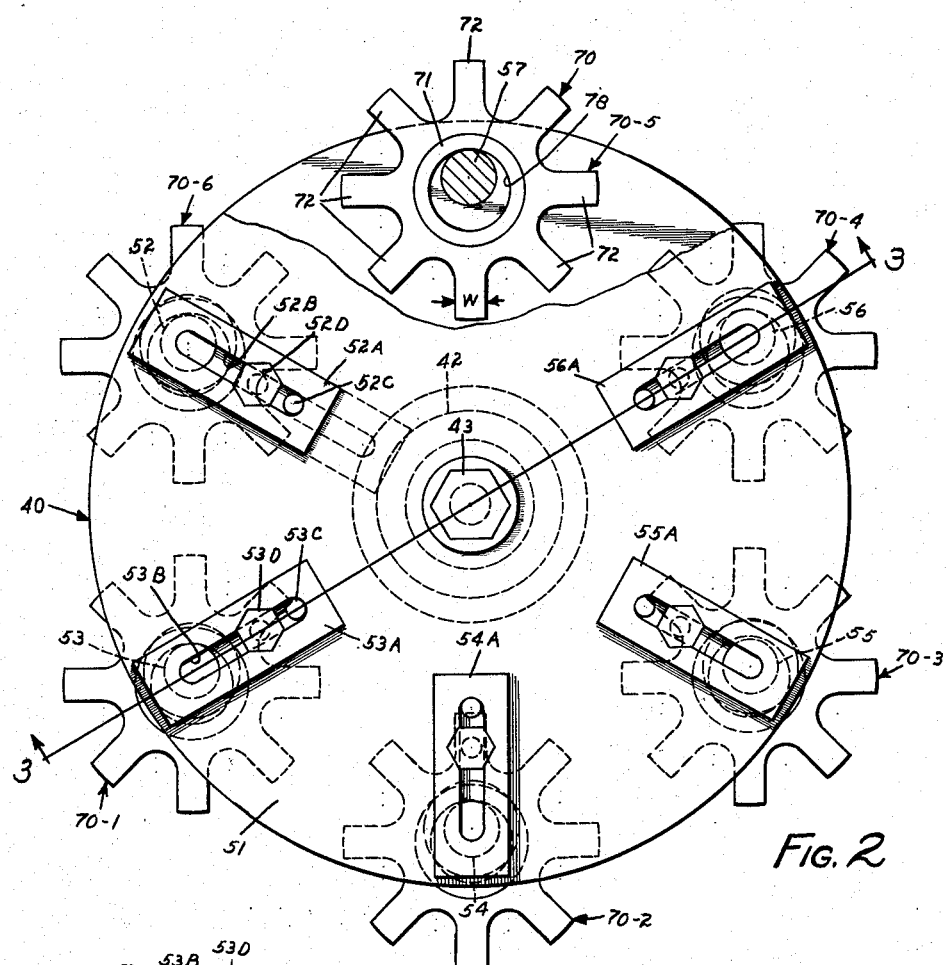
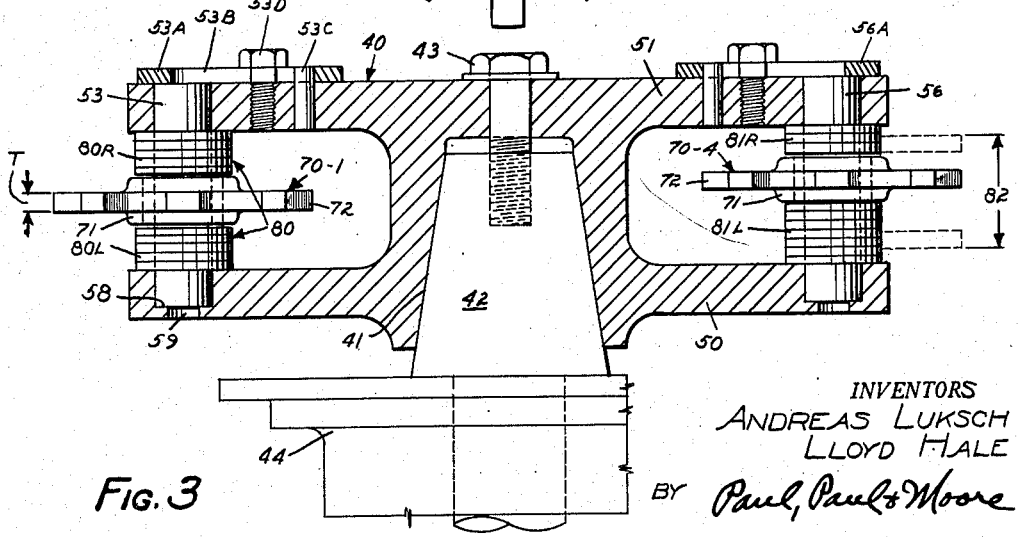
INVENTORS
ANDREAS LUKSCH
LLOYD HALE
BY Paul, Paul & Moore
ATTORNEYS

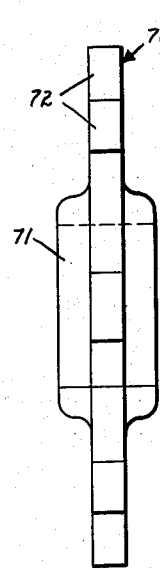
Fig.10
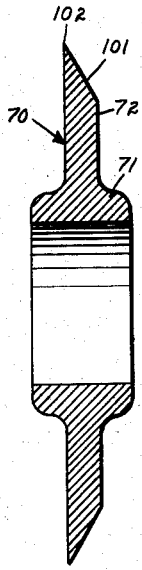
Fig.11
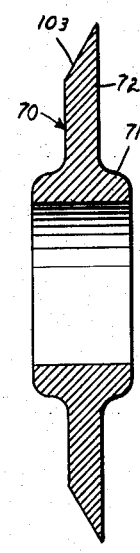
Fig.12
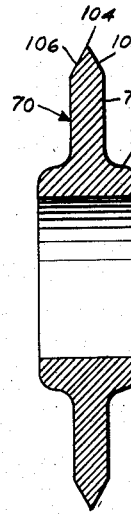
Fig.13
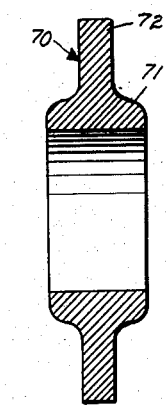
Fig.14
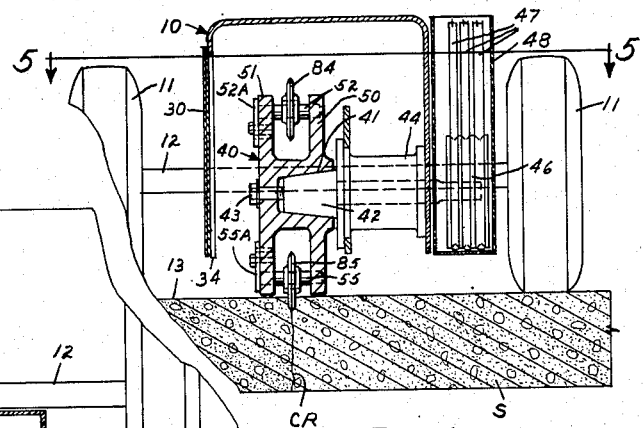
Fig.4
Fig.5

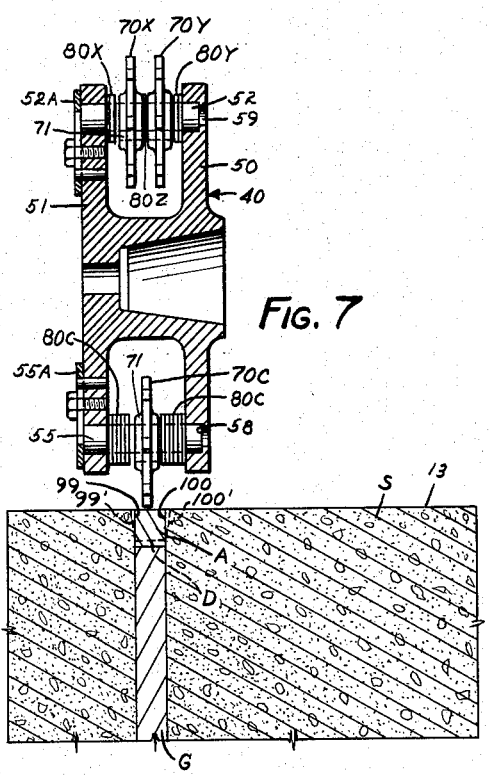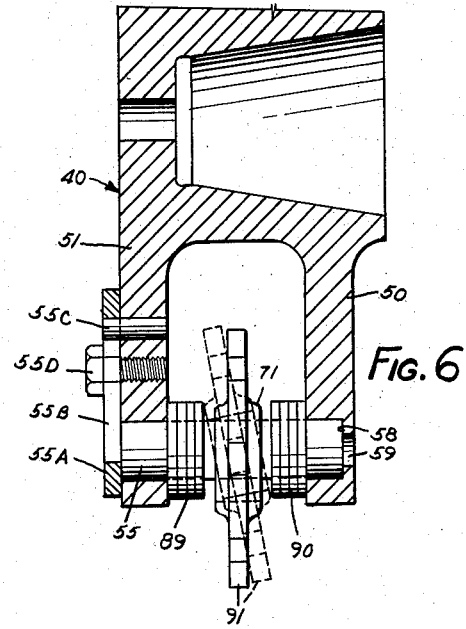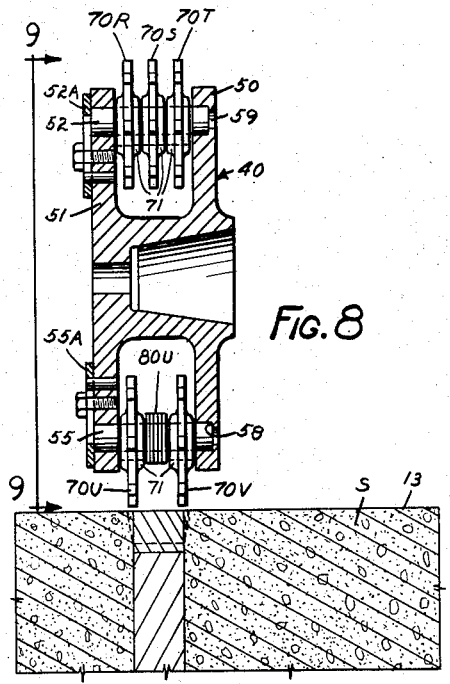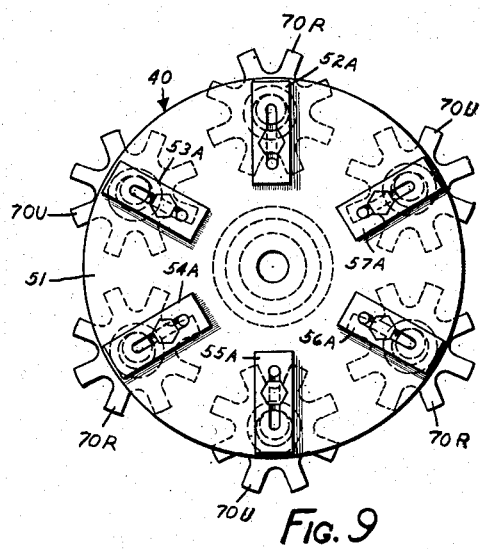

INVENTORS
ANDREAS LUKSCH
LLOYD HALE
BY Paul, Paul & Moore
ATTORNEYS

INVENTORS
ANDREAS LUKSCH
LLOYD HALE
ATTORNEYS

Dec. 29, 1953    A. LUKSCH ET AL    2,664,281
MACHINE FOR CUTTING, CLEANING, GROOVING, AND
TREATING SURFACES
Filed Aug. 27, 1949    7 Sheets-Sheet 7

INVENTORS
ANDREAS LUKSCH
LLOYD HALE
BY Paul, Paul & Moore
ATTORNEYS

Patented Dec. 29, 1953

2,664,281

UNITED STATES PATENT OFFICE 2,664,281

MACHINE FOR CUTTING, CLEANING, GROOVING, AND TREATING SURFACES

Andreas Luksch and Lloyd Hale, Minneapolis, Minn., assignors to G. H. Tennant Company, Minneapolis, Minn., a corporation of Minnesota Application August 27, 1949, Serial No. 112,798

5 Claims. (Cl. 262—20)

This invention relates to machines for the production of grooves in concrete and other hard rock-like surfaces and in hard wood and the like and for the re-opening of previously made grooves, such as sealing joints in concrete pavement and the like, and for the opening of cracks in concrete, rock, bituminous and other masonry surfaces for the introduction of sealing compounds, caulking or pointing mortar either into the old groove or crack or an opened crack, as the case may be and for leveling, indenting or opening wood and other surfaces.

Concrete surfaces which are exposed to the weather, such as roadways, airfield landing strips, building structures, and the like, as well as many natural rock surfaces and also masonry surfaces, present many joints to the weather and are normally provided with what is known as expansion joints and also, in some instances, with contraction joints, and even where not provided with such joints, the expansion and contraction of the built up or monolithic mass, due to heating or cooling, produces cracks in the mass if not placed there purposefully for such expansion or contraction. Thus, in many concrete highways of older design, for example, one will observe many cracks extending across the concrete which are due to a large extent to the cracking effect produced by changes in temperature due to the heating and cooling of the concrete slab. As knowledge in engineering design of concrete highways, air strips, and similar exposed concrete and masonry structures has progressed through the years, it has been customary to introduce into the structure at intervals, a joint or joints known either as an expansion joint or contraction joint, depending upon the purpose. The expansion joints are normally of about 1 to 2 inches in width and are filled with material which has a certain amount of resiliency so as to provide the necessary space for expansion and yet provide, to some extent, for sealing the crack or joint against introduction of moisture therethrough during expansion and contraction movement. At other places in concrete structures, joints, known as contraction joints, are provided so as to allow the adjacent portions of the concrete to pull away from each other when the structure cools to low temperatures during the winter. Again where no joints are provided, cracks are produced due to the action of the weather, and these may be in any direction across the concrete structure, usually not straight.

For proper maintenance of concrete and masonry structures and the like, particularly in areas subjected to freezing and thawing, it is essential periodically to re-seal the expansion and contraction joints and to seal any cracks which may have developed due to the weather or loading of the structure. This has been done usually by pouring melted bitumin or other plastic compounds along the joint or crack. The removal of bituminous and other sealing materials from joints in which it may have been placed or from cracks and the opening of hairline cracks for purposes of resealing has heretofore been accomplished by hand operation and has been unsatisfactory due to the amount of time and the costs involved and also due to the fact that by no hand operation yet devised has it been possible completely to remove the bituminous or other sealing material from the concrete surface to which it has been applied and thus allow a fresh seal to be made. Accordingly, the application of new sealing material to the joint or crack during resealing has always been over a film of old sealing material adhering to a greater or lesser degree, but always to an unknown degree, to the original joint or cracked surface. Likewise, the problem of opening hairline cracks for the introduction of sealing material thereinto for sealing the cracks has been accomplished by hand or by air hammer chipping which produces, at best, only a very irregular and unsatisfactory opened crack for the introduction of sealing material. In other instances, it has been found that sealing material applied to concrete, stone and other structures has flowed and crept over the surfaces adjacent to the joint or crack to which it has been applied, and the removal of this also has heretofore been accomplished only by hand or air hammer methods which have been unsatisfactory.

In other instances it is desirable to produce indentations, grooves or to level or inlay wood surfaces, as when mounting rails, or bed plates are to be mounted on plank or edge grain wood block floors. The invention provides a useful machine for overcoming such problems.

It is an object of the present invention to provide apparatus for indenting, leveling, grooving or relieving surfaces such as for joint cleaning and the opening of cracks in concrete and stone structures for the introduction of sealing material or joint or crack filling or pointing material thereinto for the making of level indentations in wood flooring or paving and the like.

It is another object of the invention to provide an improved machine power driven and capable of being operated by relatively unskilled labor for opening hairline cracks in concrete or rock surfaces, and for cleaning and refurbishing expansion or contraction joints in such surfaces preparatory to the original placing or introduction of sealing or pointing material.

It is another object of the invention to provide machines for opening joints or hairline cracks.

It is a further object of the invention to provide machines for opening expansion or contraction joints in concrete or other monolithic surfaces wherein the old material is removed in chunks and without excessive breakage and the walls of the joint are cleaned thoroughly down to fresh concrete or stone or masonry for the application of fresh sealing or pointing material into the joint, but without excessive removal of the masonry material adjacent the joint.

It is a further object of the invention to provide machines for using joint-cleaning and crack-opening cutters.

It is another object of the invention to provide a joint-cleaning machine adaptable to a wide variety of joint-cleaning and crack-opening operations on horizontal and other surfaces.

It is a further object of the invention to provide an improved joint-cleaning machine for utilizing cutters in a variety of positions for varying operations and to provide apparatus and methods whereby the cutters can be utilized throughout their full service life and even down to the hub of the cutter.

It is another object of the invention to provide an improved machine for joint-cleaning or crack-opening or cleaning in concrete, stone or other masonry surfaces, wherein the operation of the machine is always in view of the operator.

It is a further object of the invention to provide an improved joint-cleaning apparatus and improved cutter heads therefor wherein the cutters may be rapidly dismounted from the cutter head for removal, change or servicing.

Other and further objects of the invention are those inherent in the apparatus herein illustrated, described and claimed.

The invention is illustrated with reference to the drawings in which

Figure 2 is an enlarged side elevational view, partially broken away, of one form of cutter head of the exemplary joint-cleaning and crack-opening machine of Figure 1, showing the cutter head and cutters in a position of rest;

Figure 3 is an enlarged sectional view taken along the line and in the direction of arrows 3—3 of Figure 2;

Figure 4 is a fragmentary sectional view taken along the line and in the direction of arrows 4—4 of Figure 1, showing the cutter head and cutters, ground wheels and associated mechanism of an exemplary form of the joint-cutting machine, so arranged as for opening hairline cracks in monolithic material, such as concrete or stone;

Figure 5 is a fragmentary plan view taken in the direction and along the lines 5—5 of Figure 4;

Figure 6 is an enlarged fragmentary vertical sectional view of a part of the cutter head and cutter, illustrating the manner in which the cutter is deflected from an established path, when opening hairline cracks or other irregularity in the surface being worked upon;

Figure 7 is an enlarged vertical sectional view of a portion of concrete roadway showing an expansion joint of a certain width, together with the cutter head and cutters arranged for removing old joint sealing material and cleaning the side walls of the joint, preparatory to re-sealing with fresh sealing compound;

Figure 8 is an enlarged vertical sectional view similar to that shown in Figure 7, showing the cutters arranged for cleaning the side walls and for removing the joint-filling material of a somewhat wider expansion joint, as compared to that shown in Figure 7;

Figure 9 is a side elevational view of the cutter head and cutters (shown at rest) taken in the direction of arrows 9—9 of Figure 8;

Figures 10, 11, 12, 13 and 14 are illustrative of the shape assumed by the cutters during various stages of wear, Figure 10 being an end elevational view and Figures 11 through 14 sectional views of the same cutter at various stages of wear;

Figure 15:
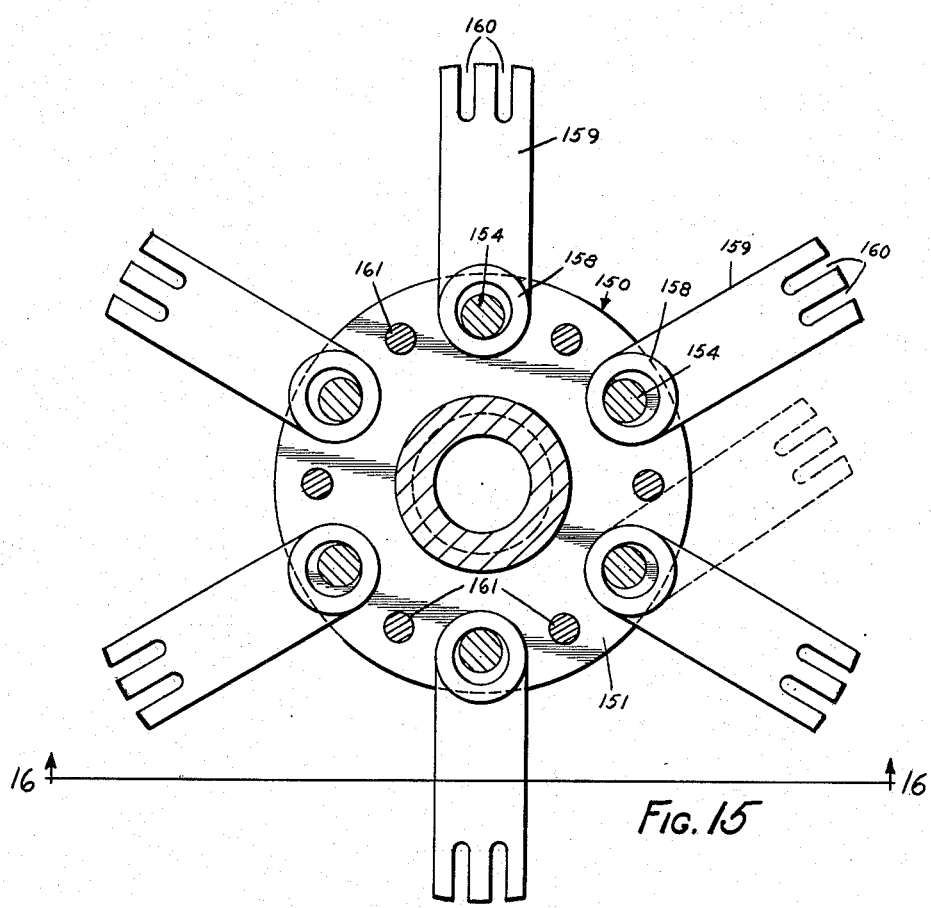
Figure 16:
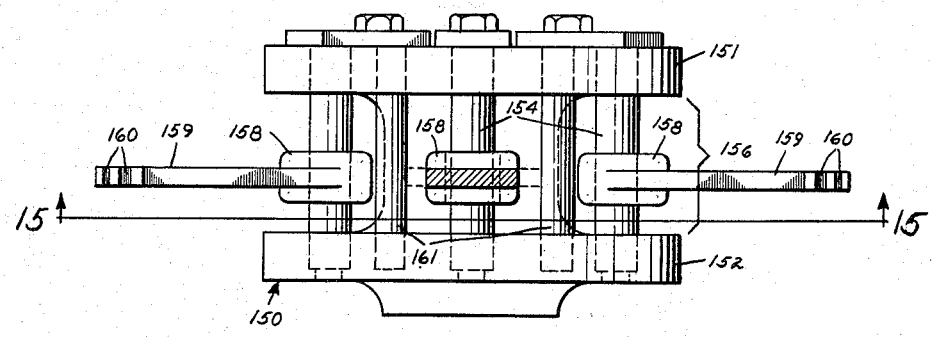
Figure 17:
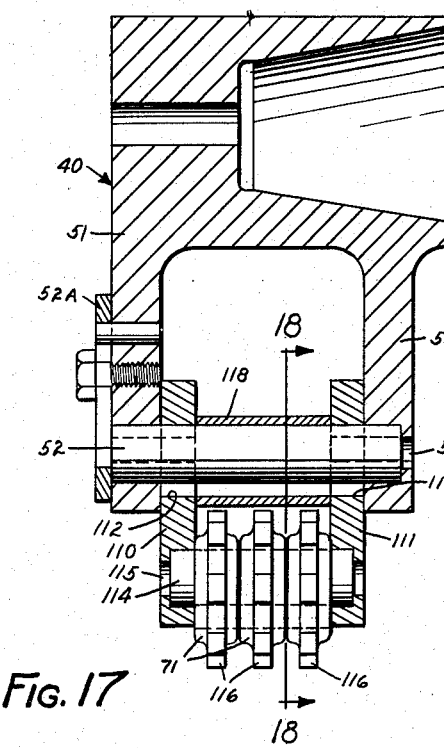
Figure 19:
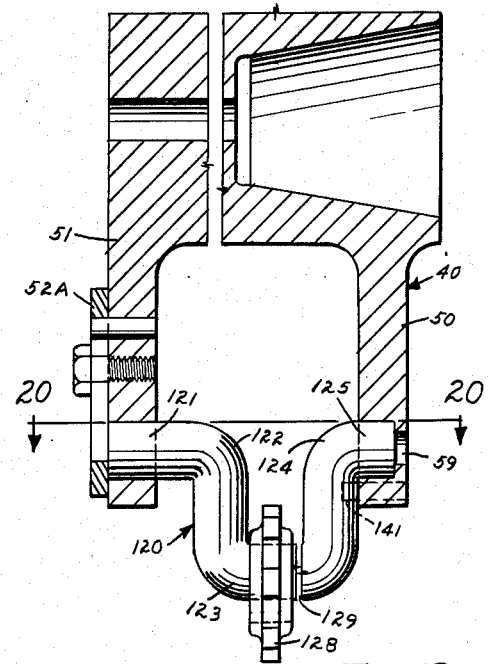
Figure 18:
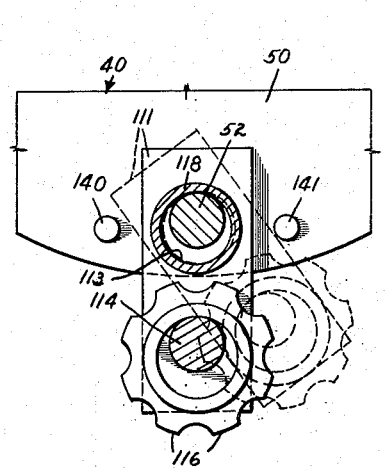
Figure 20:
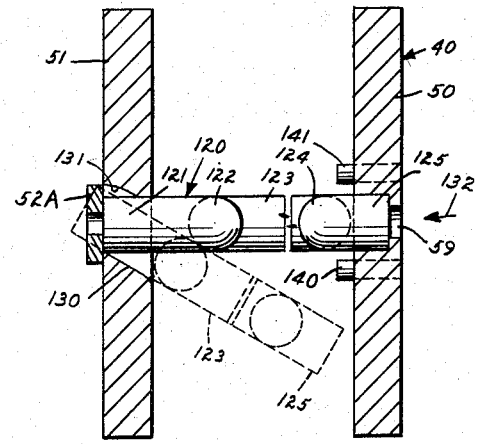
Figure 21:
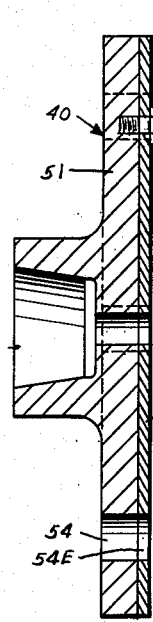
Figure 22:
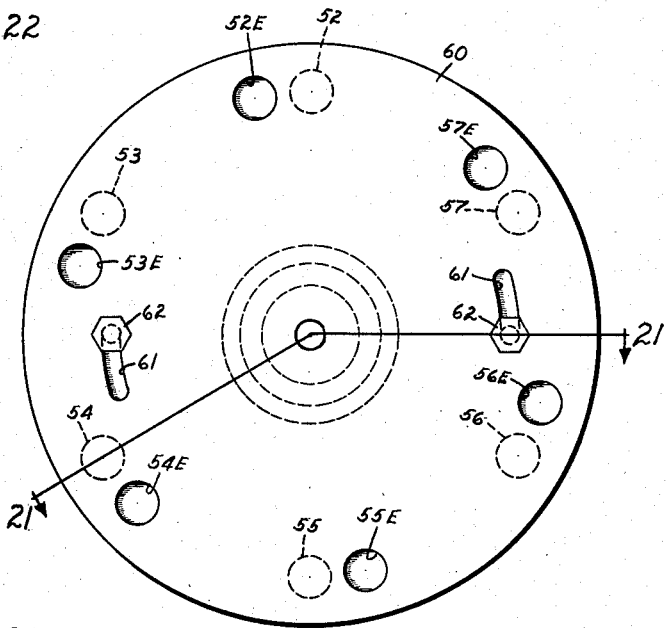

Figures 15 and 16 are, respectively, vertical sectional views and horizontal sectional views of a modified form of cutter head and cutters, Figure 15 being a sectional view taken along the line and in the direction of arrows 15—15 of Figure 16, and Figure 16 being a sectional view taken along the line and in the direction of arrows 16—16 of Figure 15;

Figures 17 and 18 are, respectively, fragmentary transverse sectional views and a fragmentary side sectional view of a modified form of cutter holder mounted upon the standard cutter head, Figure 18 being a sectional view taken along the line and in the direction of arrows 18—18 of Figure 17;

Figures 19 and 20, are, respectively, a vertical sectional view and a side sectional view of still another modified form of cutter holder mounted upon the standard cutter head, Figure 20 being a sectional view taken along the line and in the direction of arrows 20—20 of Figure 19;

Figures 21 and 22 represent a modified form of cutter pin retaining plate, Figure 21 being an exemplary form of joint-cleaning machine made in accordance with the present invention. Figure 21 is taken along line 21—21 of Figure 22, showing both apertures in alignment. Figure 22 is a face view of the cutter head and taken in the direction of arrows 22—22 of Figure 21.

Figure 23:
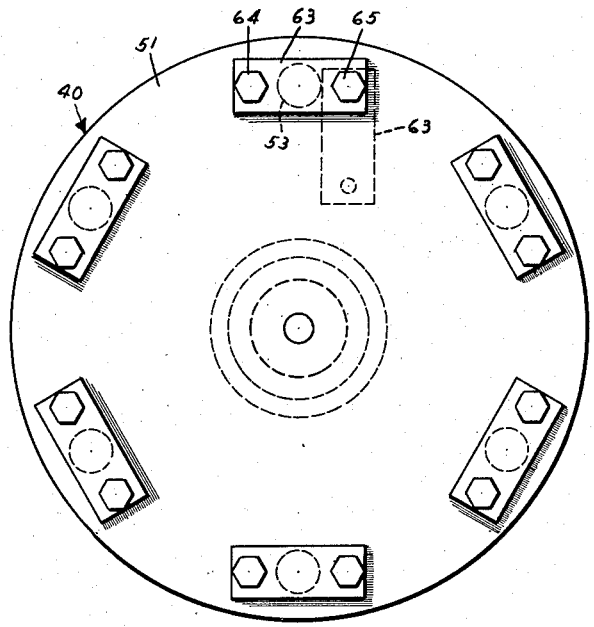

Figure 23 is a face view of a modified form for retaining the cutter pins.

Throughout the drawings corresponding numerals refer to the same parts.

The machine comprises a wheeled frame generally designated 10 having a pair of ground wheels 11 which are freely mounted upon axle 12 so that the frame can be wheeled by hand power along a surface 13 that is being worked upon. The frame 10 is provided with an operator handle 14. The handle is telescopic, being composed of a base tube 16 and a smaller tube 17 telescoped therein and held by the clamping nut 18, thus permitting the handle to be extended more or less as desired by the operator. The handle is provided with a tool box at 15 and with a cross piece at 19 which the operator grips in handling the machine. Upon the wheel frame 10 there is mounted an engine 20 having a fuel supply tank 21 and auxiliaries, such as ignition 22, muffler 23, air cleaner 24, battery 25 and a power output shaft 26, which is of the multiple groove V-belt type. The engine is mounted so as to be slidably adjustable upon the frame 10, being held in any adjusted position by the adjustment screw 28.

At the forward end of the wheel frame 10 there is a curved down housing 29 which has a door 30 hinged at one side by means of the hinges 31—31, the door being held closed by means of a pin at 32, the pin being attached by chain 33. Door 30, when opened, permits access to the cutter head 40 for removal, replacement or servicing of the head 40 and cutter elements 70. It will be noted that the wheeled frame 10 has a lower horizontal surface at 34 which is angled up along the slanting line 35. Within the curved down front section 29 of the housing, there is mounted a cutter head generally designated 40 which is shown with greater particularity in Figures 2, 3, 4 and 5. The cutter head 40 is mounted upon the tapered end 41 of the shaft 42, being held thereon by the screw 43. A key may be mounted on taper 41, if desired. Shaft 42 is journaled in the bearing housing 44 that is bolted to the wheeled frame 10 both on the outside near the pulley 46 and at the inside supporting member of frame 10, as shown in Figure 4. The shaft 42 projects outside the main housing formed by the frame 10, as shown in Figure 4, and on the outer extending end there is mounted a multiple V-belt pulley 46 having the V-belt 47 running thereover up to and over the drive pulley 26 of the engine 20. The belts 47 and pulleys 46 and 26 are preferably housed at 48 by means of a sheet metal housing for the protection of the belts and the operator.

The cutter head 40 is rotatable as a unit and is preferably composed of a casting having two flanges 50 and 51 integral with each other, although they may be made separately, if desired, and bolted together. The flanges are cross drilled at a plurality of evenly spaced points around their circumferences so as to provide a lodging space for the pins 52 through 57. It will be noted that the flange 51 is in each instance completely drilled through for the passage of the pin therethrough, as illustrated for pin 53 in Figure 3. However, the flange 50 is only drilled through part way, as illustrated at 58 and beyond this point the flange is provided with a smaller hole 59 through which a drive pin may be inserted for driving out the main cutter retaining pin 52 through 57. Each of the pins 52 through 57 is identical and each is retained in place by a holder which can be of the form shown in Figures 2-3 or the form shown in Figures 21, 22 or 23. In Figures 2-3 the pins 52—57 are retained by individual plates, all identical, numbered 52A through 57A. Each of the plates is provided with a slot, as shown at slot 52B for plate 52A. Pins 52C are driven into the flange 51 radially in respect to the pin 52 and the center of rotation of the cutter head so that when the retaining cap screw 52D is pulled down, the retaining plate 52A will be held from movement out of the radial position. When it is desired to renew the cutter or the pin 52, it is only necessary slightly to loosen the cap screw 52D, whereupon the plate 52A can be moved back to the dotted line position shown in Figure 2 and thereafter the pin 52 can be driven out by a punch inserted through the hole 59. All of the other retaining pins 53 through 57 are similarly held and can be similarly removed. It is possible to replace cutters and pins 52 through 57 one by one in the manner described above with the cutter head 40 fastened to the tapered end 41 of shaft 42 by screw 43. For efficient removal and replacement of cutters 84, 85 and pins 52 through 57 in the manner described, however, cutter head 40 is first removed from the tapered end 41 of shaft 42 by taking out screw 43 and lightly tapping frame 50 with a hammer. Cutter head 40 is then taken out through door 30 and the pins 52 and cutters 84 then replaced.

A modified form of retaining plate is shown in Figures 21 and 22. In this instance all of the pins 52 through 57 are retained by a single disklike plate 60 which is provided with a plurality of holes 52E through 57E which are arranged so that when the plate 60 is rotated, all of the holes 52E through 57E will be brought into registry with the pins 52 through 57 and hence the pins can be driven out through them. A small degree of rotary movement of the plate 60 is provided by a pair of arcuate slots 61, two of which are shown in Figure 22. A pair of cap screws 62—62 are inserted through the arcuate slots 61 and when these are loosened, the plate 60 can be moved arcuately so as to bring the holes 52E—57E into registry with the pins 52—57 so as to permit the removal of the pins, or plate 60 can be moved to the position shown in Figure 22, and the cap screws 62 tightened down, in which case the plate 60 firmly retains all of the pins 52—57 in place.

In Figure 23 there is illustrated still another form of pin retaining means. In this instance there is provided a retaining bar 63 for each of the pins, as illustrated for the pins 53 in Figure 23. Each of the bars 63 is held in place by a pair of cap screws 64—65. When one of the screws, either 64 or 65 is removed, and the other loosened, the entire bar can be rotated to the position shown in dotted lines and the pins, as illustrated by pin 53, can thence readily be driven out for rearrangement or replacement of the cutters. When the plate 63 is in the position shown in Figure 23, it firmly retains the pin 53 in place. All of the other pins are similarly held in place in the form shown in Figure 23.

Upon the pins 52—57 there are mounted cutters generally designated 70, each of which has a hub portion 71 and a plurality of radially outwardly extending spokes 72. The spokes are of substantially uniform width W (see cutter 70-5, Figure 2) from their outer tip to near the point where they fasten to the hub 71 and they are preferably of substantially uniform thickness T, as shown in Figure 3. The entire cutter is a unitary drop forging of adequately hardened steel. The hub 71, as shown in Figure 2, has a center opening 78 which is substantially larger than the pin 52—57 upon which it may be mounted, thus permitting the entire cutter 70 a freedom of movement radially and transradially, as well as a freedom of tipping movement, as shown in Figure 6, provided the spacing washers 80 do not fill up the entire space between the hub and adjacent cutters or the insides of flanges 50 or 51 of the rotary cutter head.

Referring to Figure 3 specifically it will be noted that the cutter 70-1 is arranged in almost the central position and is held by a plurality of washers 80 on each side. The number of washers placed on the right side 80-R and the left side 80-L depends upon the position where it is desired that the cutter 70-1 should operate and the cutter can be shifted from side to side by removing washers from one side and replacing them on the opposite side. Thus, as shown for cutter 70-4 of Figures 2-3, a different number of washers (viz. 3 washers) is shown at 81-R than the number (five washers) shown at 80-R. Similarly, seven washers are provided at 81-L, as compared with five at 80-L. In this way the cutter 70-4 is shifted in position, as compared with the cutter 70-1. Any of the remaining cutters 70-2, 70-3, 70-5 and 70-6 can likewise be positioned at any place along their mounting pin by varying the number of washers on each side of the cutter, so that each cutter tracks in the position desired.

In this connection it may be noted that the number of washers placed on opposite sides of the cutters, where washers are used (compare Figure 3) is insufficient to cause any appreciable binding of the hub 71 of the cutter so that the cutter is free to rotate and also to move axially and also radially in respect to the pin. In Figures 2-3 it may be assumed that the cutters 70-1 to 70-6 are arranged so that the hub 71 of one of the cutters is against the inner surface of flange 50 and the hub of another cutter against the inner surface of the opposite flange 51 and the remaining cutters distributed across the space and held by washers appropriately positioned on opposite sides of each cutter, so as to permit the cutters as an assembly to cut a width indicated by the dimension 82 in Figure 3, wherein the dotted-in cutter positions adjacent cutter 70-4 represents the extreme width spanned by the cutters as an assembly. When a cutter head, such as that shown at 40 in Figures 2-3 is equipped with cutters as described, it will cut into concrete or stone a groove having a depth equal to that portion of the length of the spoke-like teeth of the cutters, which projects beyond the periphery of cutter head 40. If there is no groove, the machine can be used for cutting a groove directly into concrete or stone, whereas if there is a groove already provided the machine will clean it out and freshen the side wall surfaces of the groove.

Referring to Figures 4, 5 and 6 for opening hairline cracks preparatory to the filling of the crack with sealing compound or jointing cement as in pointing, it is preferable to mount only one cutter on each pin 52—57 and to omit some or all of the spacing washers 80 on each side of the hub of the cutter. Thus, as shown in Figure 4 the cutters 84 and 85, which are representative of the six or more cutters on the rotary cutter head 40, are mounted on the pins 52 and 55 without any spacing washers at either side of the hub of the cutter and hence each of the cutters is free to move along its pin 52—55. This freedom of movement is a feature of the invention. Thus, we have discovered that when a rotary cutter head 40 is equipped with freely mounted cutters, such as those illustrated at 84 and 85, the cutters follow along the hairline crack, as shown in the concrete slab S of Figure 5, and even though the direction of the crack may change, the cutter will follow the crack without any steering or guiding of the machine proper, within the limits of movement defined by the outer and inner flanges 50 and 51 of the rotary cutter head. Thus, as shown in Figure 5, the cutter represented by cutter 85 has followed along the crack CR and has opened the crack already, as shown by the portion CR' to any depth desired, the machine proper having been moved straight along without guiding except generally to follow the crack and keep it within the space between flanges 50 and 51 of cutter head 40. In carrying out the method illustrated by Figures 4, 5 and 6, the grooving machine is merely traversed so that the crack CR is within the space between the inner surfaces of flanges 50 and 51 of the rotary cutter head 40. The center elements, as illustrated at 84—85, Figure 4, however many may be used on the cutter head, will track along the crack, each cutter element moving along its mounting pin 52—57 so as to follow the irregularities in direction of the crack, opening the crack to any depth desired. In some instances where a lesser degree of movement is desired, the cutter elements may have only a few spacer washers, as shown at 89 and 90 in Figure 6, thus allowing a limited amount of space for movement of the cutter element 91 from the straight to the dotted line positions, as there shown.

Figure 1:
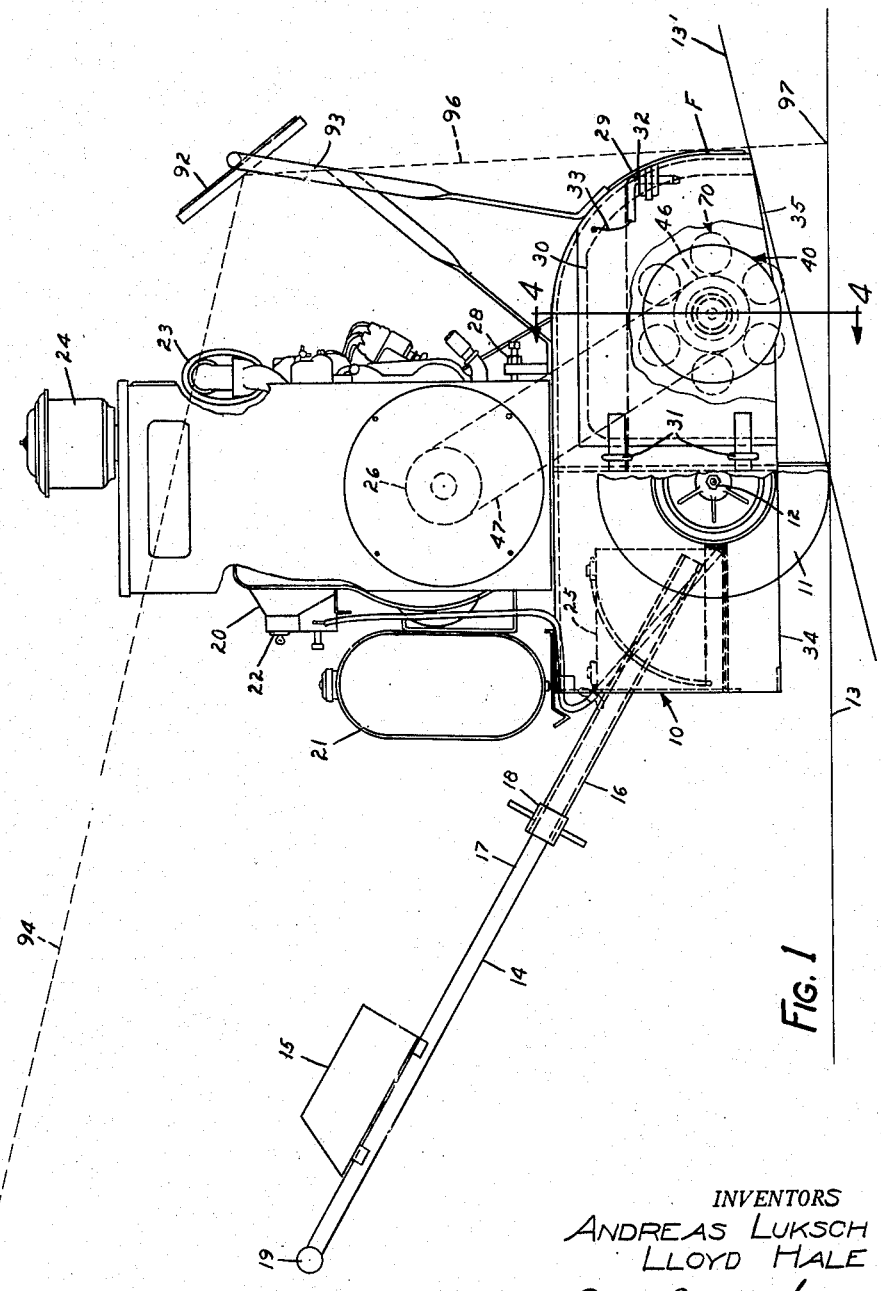
Figure 1 is a side elevational view of an illustrative embodiment of a machine of the invention, partially broken away so as to expose the working mechanism of the device.

The guiding of the machine so as generally to follow a joint or generally follow a hairline crack is easily accomplished by means of the mirror arrangement 92 shown in Figure 1, the mirror 92 being mounted upon a frame 93 so that the line of sight 94 from the operator station 95 will be reflected down along the line 96, thus permitting the operator to view that portion of the joint or crack at 97 immediately ahead of the machine. In this connection it may be noted that the entire machine shown in Figure 1 is illustrated in the transporting condition, but that during use the machine front at F is permitted to move down towards the surface being worked upon, and in the operating position the surface 13 being worked upon is then relative to the machine, as shown by the line 13', the cutter elements being then in the position to strike against and cut the surface illustrated by line 13.

For the opening of old expansion joints, contraction joints or the like, or wide cracks which may have previously been sealed with bitumin, mastic or other sealing compound, it is desirable not only to cut the side walls of the joint or crack fresh and thus remove the old bitumin or sealing compound in its entirely, but also to break out the old sealing compound in chunks to a prescribed depth so as to allow a goodly amount of fresh sealing compound to be poured in. To accomplish this purpose, in accordance with the present invention, the cutter head 40 is equipped with a plurality of cutter elements 70, at least some of which are arranged so as to be spaced from each other a distance slightly greater than the groove being cleaned. Thus, in Figure 7, cutter elements in positions 70X and 70Y are spaced apart from each other and held by washers 80Y and 80X and by spacing washer 80Z between the cutters so that the cutting spokes of the cutters 70X—70Y will engage upon the sides 99 and 100 of the groove G in the concrete slab S being worked upon. Thus, when cutter 70X strikes, it cuts into the side 99 of the groove G, producing a slightly beveled cut, as at 99', and cutter 70Y cuts into the side wall of the groove G, as at 100, causing a slightly beveled cut at 100'. In addition to cutters 70X and 70Y which may occupy all but one or two of the six positions on the cutter heads, there are provided at least one or two cutters in a central position, thus as shown for cutter 70C in Figure 7, the latter being held in position by washers 80C and held in a central position thereby, although not so securely held as to prevent free rotary and limited sidewise movement of the cutter 70C. The single cutter 70C or two central cutters, if two such cutters are used on the cutter head, is sufficient to break out chunks of old sealing compound A to a depth D, and the resultant cut produced in the groove has clean fresh masonry side walls at 99' and 100' and is completely free from old mastic, sealing compound or precast expansion joint material to a depth D. It may be pointed out that the cutters 70X and 70Y which cut opposite side walls of the groove need not be on the same pin but may be on different pins arranged and held in proper relative position axially of the cutter head 40 by means of washers suitably inserted adjacent opposite sides of the cutters, all as illustrated in Figure 3. Furthermore, it is seldom necessary to use more than two central cutters 70C for cleaning out bitumin. It is preferable not to use more than two central cutters so that bitumin is not broken into excessively small bits in being removed.

Referring to Figures 8 and 9 there is illustrated the spacing of the cutters used for cleaning the walls of an expansion joint and removing the old expansion joint sealing material for a groove which is somewhat wider than that shown in Figure 7. Thus, upon two or three of the pins there may be mounted cutters 70R, 70S and 70T, all or one of which may be upon the same pin and upon others of the pins only outside cutters at 70U and 70V are used, being held apart suitably by the washers 80U. Again, it may be pointed out that the outside cutters 70U and 70V need not be upon the same pins but may be on successive or widely spaced pins so long as held in proper position relative to a plane normal to the axis of the rotary cutter head 40. Again the central cutters 70S may be on two separate pins as shown in Figure 7, or located with one or more cutters on a pin, as shown in Figure 8. For all patterns of cutters assembled on the cutter head 40, it is essential that the arrangement be in reasonable balance. Thus, taking Figure 9 as an example, cutters 70R, 70S, 70T are mounted on one pin alternating with cutters 70U and 70V mounted on the next pin. Another balanced pattern would be to mount cutters 70R, 70S, 70T or pins 52A and 55A, while cutters 70U and 70V are mounted on pins 53A, 54A, 56A, and 57A.

Referring to Figures 10–14 there is illustrated another feature of the invention showing the manner in which the cutter elements 70 are utilized so as to obtain maximum wear and effectiveness. Figure 10 illustrates a new cutter prior to being used. Figure 11 illustrates the shape to which the cutter is worn in an outside cutting position, such as shown at 70Y, Figure 7, or 70T or 70V of Figure 8. The angle portion at 101 is worn away by contact with the adjacent side of a groove, as by contact with the adjacent side 100 of the groove G in Figure 7, in producing the beveled side wall cut 100'. The angle of beveling at 101 of the cutter (Figure 11), however, corresponds approximately to the angle 100' to which the groove is cut and the cutter wears to a sharp edge at 102. Similarly, in Figure 12 there is illustrated the beveled wearing position which is achieved by a cutter positioned as at 70X in Figure 7 or 70R or 70U in Figure 8. Again the angle portion 103 is due to the wearing action produced by contact with the surface 99 of the groove G, Figure 7 in producing the bevel cut 99'. When one of the cutters as in Figure 11 or 12, which was produced in one outside position, is put in the opposite outside position, it wears to a line edge, as shown at 104 in Figure 13, and to a slightly lesser diameter. The line edge cutters of Figure 13 are of especial usefulness in opening hairline cracks, as previously described with reference to Figures 4, 5 and 6, it having been discovered that the line edge cutter produced by a previous cutting operation follows the hairline crack with greater fidelity than a new or blunt cutter. It may be noted in passing that the line edge cutter 104 of Figure 13 retains its line edge for a comparatively long time in crack opening operations since the edge 104 does relatively little cutting, the wear being concentrated upon the side portions 105 and 106. The edge 104 follows the crack CR and thus is subjected to very little wear, whereas the sides 105 and 106 cut away the sides of the crank and hence are subjected to greater wear than the edge 104 itself. Where a cutter is subjected to continued operation on a sound flat surface, the wear gradually reduces the spoke-like portions 72 to the form shown in Figure 14 and even smaller down to the hub 71. Cutters of this form are shown being used in Figures 17–20.

In Figures 17–20 there is provided an auxiliary cutter holder for using cutters which are worn down to a small diameter, practically to the hub 71. Thus, as shown in Figures 17 and 18, the rotary cutter heads 40 having the pins 52–57 therein is provided with a pair of reach arms 110 and 111 which are apertured at 112 and 113 so that the pins 52—57 pass therethrough, it being noted that the apertures 112 and 113 are of considerably larger diameter than the pins so as to permit movement transverse to the axis of the pins. The outer end of each of the reach arms 110—111 is drilled through a part of its depth to a diameter sufficient to receive a pin 114, the remaining thickness of the reach arm being drilled to a smaller diameter as at 115 so as to provide space for a punch to be entered for driving out the pins. The pins 114 serve to receive a plurality of cutters 116 which have previously been worn to relatively small diameters. The portion of the reach arms 110—111 which are held by the pins 52—57 are preferably held apart by a spacing collar 118. The entire assembly composed of the two reach arms 110—111, pin 114 and the cutters 116 moves as a unit pivoting about the pins 52—57 and produces a cutting and hammering action useful in surfacing small areas of concrete and for opening grooves of shallow depth.

In Figures 19 and 20 there is illustrated another form of worn cutter holder. Thus, in Figure 19 there is shown the bent pin 120 having the straight portion 121 bent at 122 so as to form a crank portion at 123 which is again reverse bent at 124 so as to provide the stub end 125. The crank portion 123, while illustrated as of a width to receive only one cutter 128, may be extended at the break 129 so as to receive a number of cutters on the crank portion. The crank assembly 120 may be removed from the cutter head 40, as shown in Figure 20, the cutter head being provided at 130 with a side cut in the hole which receives the shank 121 of crank 123. At the opposite side of the hole in flange 51 it is cut away at 131. Thus, the pin 121, after being driven in the direction of arrow 132 by a draft pin, can be moved to the position shown in dotted lines and thence withdrawn in a turning angular movement. In both of the modifications shown in Figures 17–18 and Figures 19–20 the pins 52—57 or the bent crank type pin 120 is held in position by retainers 52A—52A as previously described, and in each instance for the use of worn cutters there are provided limit pins 140—141 which serve to limit the swinging action of the arms 110—111, where used, or the crank type pin 120.

Referring to Figures 15 and 16, there is illustrated a modified form of cutting head and hammer. In this instance the cutting head generally designated 150 is of somewhat smaller diameter than shown in the previous figures and is provided with a pair of flanges 151 and 152, between which reach a plurality of retaining pins 154 which are retained in place when positioned so as to reach across the space 156 between the flanges, in the same manner as described for the pins 52 through 57 for the cutter head 40, Figures 2 and 3. The portion of the pins 154 in the space 156 serves as a mounting for a plurality of hammers of the shape shown in Figure 15 having the hub portion 158 and a radially extending hammer portion 159 terminating in the cut end 160. Between the retaining screws 154 are a plurality of rivets or pins 161 which serve to limit the amount of swinging of the hammers 159.

The invention is not limited to operation on concrete and masonry surfaces but is useful likewise in operating upon bituminous pavement and surfaces, on wood surfaces and the like, whether horizontal or inclined, where it is desirable to level, indent, groove, or recess a portion of the surface for sealing, installing a patch, installing mounting plates and the like. For such uses a plurality of cutters are used on the cutter head 40, as illustrated in Figures 8 and 9, for example, and the handle 19 is manipulated so that the cutters travel in an orbital path of swinging movement which is also a cylindrical path, intersecting the surface to be cut. The machine is then progressed back and forth and sideways, the cutters being maintained always at a constant depth. In this way a groove or area may be opened up for the purpose of patching or for indenting rails, bed plates or the like.

As many apparently widely different embodiments of this invention may be made without departing from the spirit and scope thereof, it is to be understood that we do not limit ourselves to the specific embodiments herein.

What we claim is:

1. A mobile frame having means for guiding it over a surface which is to be worked upon, a shaft journalled on the frame in a position such that it will be generally parallel to the surface over which the frame moves and generally transverse to the direction of movement of the frame, rotary power means on the frame and connected to the shaft for rotating it, a cutter element mounting pin mounted on the shaft so as to rotate orbitally when the shaft is rotated, said pin being generally parallel to the axis of the shaft and positioned radially from the axis of the shaft, an apertured cutter element mounted on the pin for axial movement relative thereto, the aperture of the cutter element being larger than the pin on which it is mounted, spaced stop means mounted on the machine for defining limits of movement of the cutter element axially on the pin, the size of the cutter element aperture with reference to the size of the pin and spacing of the spaced stop means relative to the cutter element being such that the cutting face of the cutter element can move a distance, the component of which distance in the direction of the shaft axis being a distance greater than the cutting face thickness of the cutter element.

2. The apparatus of claim 1 further characterized in that the shaft is provided with a plurality of cutter element mounting pins spaced around the axis of the shaft and cutter elements on said pins.

3. The apparatus of claim 2 further characterized in that the spaced stop means on the machine for defining limits of movement of the cutter element axially on one pin are displaced in a direction axially in respect to the shaft relative to the spaced stop means on the machine for defining limits of movement of the cutter elements axially on another pin.

4. The apparatus of claim 2 further characterized in that the shaft is provided with a demountable hub having a pair of spaced circular flanges thereon said flanges being drilled with aligned holes radially spaced from the axis of the hub for receiving the pins, and means is provided on the flanges for removably retaining the pins in the holes.

5. The apparatus of claim 4 further characterized in that the spaced stop means on the machine for defining limits of movement of the cutter elements axially on the pins are constituted by elements loosely mounted on the pins between the cutter elements and the flanges.

ANDREAS LUKSCH.
LLOYD HALE.

References Cited in the file of this patent

UNITED STATES PATENTS

| Number | Name | Date |
|--------|------|------|
| 481,380 | Walker | Aug. 23, 1892 |
| 743,307 | Messer | Nov. 3, 1903 |
| 1,629,818 | Ferris et al. | May 24, 1927 |
| 1,758,647 | Burrell et al. | May 13, 1930 |
| 1,795,109 | Degenhardt et al. | Mar. 3, 1931 |
| 1,964,746 | Sloan | July 3, 1934 |
| 2,009,500 | Kramer | July 30, 1935 |
| 2,336,487 | Lewis et al. | Dec. 14, 1943 |
| 2,468,336 | Lewis | Apr. 26, 1949 |

FOREIGN PATENTS

| Number | Country | Date |
|--------|---------|------|
| 366,013 | Great Britain | Jan. 20, 1932 |
| 530,654 | Germany | July 31, 1931 |
| 551,996 | Great Britain | Mar. 18, 1943 |